3,651,066
POLYHALO-4-NITROSOPYRIDINES
Penelope B. Domenico, Danville, Calif., assignor to The Dow Chemical Company, Midland, Mich.
No Drawing. Filed Nov. 4, 1969, Ser. No. 874,064
Int. Cl. C07d 31/26
U.S. Cl. 260—290 HL                 4 Claims

ABSTRACT OF THE DISCLOSURE

Disclosed as novel compounds are polyhalo-4-nitrosopyridines which may be substituted in the 6-position by cyano, trifluoromethyl or methylsulfonyl groups. The compounds have utility as pesticides and are variously effective as herbicides and as active constituents of fungicidal and bacteriocidal compositions.

CROSS REFERENCE TO RELATED APPLICATION

Copending application, Ser. No. 772,429, filed Oct. 31, 1968, discloses a novel method of preparing the compounds of the present invention.

SUMMARY OF THE INVENTION

The novel compounds of this invention are polyhalo-4-nitrosopyridines of the formula

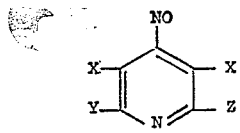

wherein X represents hydrogen chlorine or bromine, Y represents chlorine, bromine or fluorine and Z represents hydrogen, chlorine, bromine, fluorine, cyano, trifluoromethyl or methylsulfonyl. For convenience of description, the compounds coming within the scope of the foregoing formula are referred to in the specification and claims as "polyhalo-4-nitrosopyridine" compounds, or more simply as "nitrosopyridine" compounds.

The novel compounds of this invention are white to yellow solids having very slight solubility in water and good solubility in benzene, actone, pentane, hexane, dichloromethane and isopropanol. Said novel compounds have utility in a wide variety of pesticidal applications. They are particularly useful in the agricultural field as both pre-emergent and post-emergent herbicides. They also have utility for anthelmintic applications and as active ingredients of various bacteriocidal and fungicidal compositions.

Representative novel compounds coming within the scope of the present invention include the following:

tetrochloro-4-nitrospyridine
2,3,5-trichloro-4-nitrosopyridine
2,3,5-trichloro-6-fluoro-4-nitrosopyridine
tetrabromo-4-nitrosopyridine
2,3,5-tribomo-4-nitrosopyridine
2-bromo-3,5-dichloro-4-nitrosopyridine
3,5-dichloro-2,6-difluoro-4-nitrosopyridine
2,3,5-trichloro-4-nitroso-6-(trifluoromethyl)pyridine
3,5,6-trichloro-4-nitrosopicolinonitrile
3,5-dichloro-2-(methylsulfonyl)-4-nitrosopyridine
3,5,6-tribromo-4-nitrosopicolinonitrile
2,3,5-tribromo-6-(methylsulfonyl)-4-nitrosopyridine
3,5-dichloro-6-fluoro-4-nitrosopicolinonitrile
3,5-dibromo-6-fluoro-4-nitrosopicolinonitrile
3,5-dibromo-2,6-difluoro-4-nitrosopyridine
3,5-dichloro-2-fluoro-6-(methylsulfonyl)-4-nitrosopyridine
3,5-dichloro-2-fluoro-4-nitroso-6-(trifluoromethyl)pyridine The polyhalo-4-nitrosopyridine compounds of the present invention can be prepared by intimately contacting and causing to react concentrated nitric acid with the corresponding polyhalopyridine having a thiol group attached to the 4-position of the pyridine ring, as represented by the formula

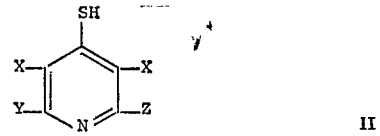

wherein X, Y and Z have the meanings as defined above in connection with Formula I. The reaction takes place as the thiol compound is gradually added to an excess of stirred nitric acid having a HNO₃ concentration of from about 90 to 100 percent, as the reaction temperature is maintained at from about minus 20° C. to about plus 25° C. The concentrated nitric acid is employed in an amount of at least 10 or 20 moles or more for each mole of the thiol. The reaction takes place very rapidly and is frequently complete by the time the reactants have been mixed together, or within a few minutes thereafter. The reaction can be terminated by pouring the mixture into cold water, thereby separating out the desired polyhalo-4-nitrosopyridine compound which can be filtered off or otherwise separated and then purified by conventional methods from the remaining liquid. If the reaction mixture is allowed to stand too long before being poured into water, or if the temperature of the mixture is allowed to rise above 25° C., the nitroso groups tend to be converted to nitro groups. This can be avoided by maintaining low reaction temperatures and short reaction times, as noted above. It is also important to the obtaining of a good product yield that the thiol reactant be substantially free of any moisture content.

The compounds of this invention can be prepared by adaptations of procedures known to those skilled in the art. Thus, it is to be understood that modifications of other methods known in the art for the preparation of compounds having similar halo, nitroso, cyano, methylsulfonyl or trifluoromethyl groupings may be substituted for the above procedures.

DESCRIPTION OF THE PREFERRED EMBODIMENTS

The following examples illustrate the invention but are not to be construed as limiting:

EXAMPLE 1

Tetrachloro-4-nitrosopyridine

Ten grams (0.04 mole) of anhydrous tetrachloro-4-pyridinethiol are slowly added to 10 ml. of nitric acid having a HNO₃ concentration of 100 percent (approximately 0.5 mole) as the latter is stirred at a temperature of minus 20° C. The temperature of the stirred mixture is then allowed to rise slowly, it being 25° C. at the end of 1 hour following the start of the reaction. The reaction mixture is then poured into ice water, thus precipitating out a solid which is filtered off, washed and dried. There is recovered 4.59 grams of a light yellow solid having a melting point of 118° C. Infrared analysis discloses the product to be 2,3,5,6-tetrachloro-4-nitrosopyridine, and this is confirmed by elemental analysis which discloses the compound to have carbon, chlorine and nitrogen contents of 24.98, 58.38 and 11.51 percent, respectively, as against theoretical values of 24.42, 57.65 and 11.4 percent, respectively, for these elements in the said compound.

EXAMPLE 2

2,3,5-trichloro-4-nitrosopyridine

Four and one-half grams of 2,3,5-trichloro-4-pyridinethiol are slowly added to 9 ml. of 100 percent $HNO_3$, with stirring, over the course of several minutes, the reaction mixture being maintained at minus 10° to 0° C. during this period. The solution is then allowed to come to room temperature, following which it is poured into ice water, thereby precipitating out a solid which is filtered off and then taken up in benzene and dried with sodium sulfate. Following this, the benzene is stripped off and the solid is thereafter dissolved in pentane and cooled to induce the formation of a yellow solid having a melting point of 36° C. which is very slightly soluble in water and of good solubility in acetone, benzene, hexane and pentane. Infrared analysis discloses the product to be 2,3,5-trichloro-4-nitrosopyridine; this analysis is confirmed by elemental analysis which shows the compound to have carbon, hydrogen, chlorine and nitrogen contents of 28.3, 0.6, 53.26 and 13.7 percent, respectively, as against theoretical contents for these elements of 28.45, 0.47, 50.3 and 13.28 percent, respectively.

EXAMPLE 3

2,3,5-trichloro-6-fluoro-4-nitrosopyridine

Ten grams of 2,3,5-trichloro-6-fluoro-4-pyridinethiol are added over a one minute period to 40 ml. of 100 percent $HNO_3$ maintained at minus 10° C. The solution is then allowed to come to room temperature, following which it is poured into ice water. The resulting precipitate is filtered off, taken up in benzene and dried with sodium sulfate. The benzene is then distilled off and the residue is taken up in hexane and pentane. On cooling this solution there is recovered a cream-colored solid having a melting point of 145° C. which is substantially insoluble in water and of good solubility in acetone, benzene, hexane and pentane. Infrared analysis discloses the material to be 2,3,5-trichloro-6-fluoro-4-nitroso-pyridine. This is confirmed by elemental analysis which shows the compound to have carbon, chlorine and nitrogen contents of 26.32, 46.48 and 12.23 percent, respectively, as against theoretical values for these elements of 26.2, 46.5 and 12.21 percent, respectively.

EXAMPLE 4

Tetrabromo-4-nitrosopyridine

In a manner similar to that described above in Example 3, tetrabromo-4-pyridinethiol is reacted with 100 percent $HNO_3$ to produce tetrabromo-4-nitrosopyridine. The product is recovered as a light yellow solid having a melting point of 139° C. which is substantially water-insoluble and of good solubility in benzene, acetone and other organic solvents.

EXAMPLE 4

2,3,5-trichloro-4-nitroso-6-(trifluoromethyl)pyridine

Three grams of 2,3,5 - trichloro-6-(trifluoromethyl)-4-pyridinethiol are slowly added to 5 ml. of 100 percent $HNO_3$ at 0° C. The mixture is allowed to come to room temperature and is then poured into ice water. The precipitate which forms is filtered off and dried. There is thus obtained a cream-colored product having a melting point of 132° C. which is substantially insoluble in water and of good solubility in benzene and hexane. The product is identified as 2,3,5 - trichloro - 4 - nitroso-6-(trifluoromethyl)-pyridine by infrared analysis, and this is confirmed by elemental analysis which discloses the compound to have carbon, chlorine and nitrogen contents of 26.1, 38.58 and 9.6 percent, respectively, as against theoretical values for these elements of 25.8, 38.06 and 10.0 percent, respectively.

EXAMPLE 6

3,5,6-tribromo-4-nitrosopicolinonitrile

Ten grams of 3,5,6-tribromo-4-mercaptopicolinonitrile are slowly added to 40 ml. of 100 percent $HNO_3$, the reaction being maintained at minus 5° C. during this addition period. The solution is then allowed to stand at room temperature for 1 hour, after which it is poured over ice water. There is formed a yellow precipitate which is filtered off and taken up in hot benzene containing sodium sulfate as a dissicating agent. The reaction mixture is then filtered, and the filtrate is heated to drive off the solvent. The residue is taken up in hexane and then recrystallized therefrom. There is recovered 3.5 g. of a yellow solid melting at 132° C. which is soluble in benzene, hexane and acetone. It is substantially insoluble in water. This product is identified by infrared and nuclear magnetic resonance analysis as the captioned compound. This is confirmed by elemental analysis which discloses the compound to have carbon, bromine and nitrogen contents of 19.57, 63.6 and 10.93 percent, respectively, as against theoretical values for these elements of 19.48, 64.8 and 11.3 percent, respectively.

EXAMPLE 7

3,5,6-trichloro-4-nitrosopicolinonitrile

Using essentially the same procedure as described in Example 6, 3,5,6 - trichloro-4-mercaptopicolinonitrile is reacted at 0° C. with 100 percent $HNO_3$ to produce 3,5,6-trichloro - 4 - nitrosopicolinonitrile having a molecular weight of 211.44.

EXAMPLE 8

3,5-dichloro-2-(methylsulfonyl)-4-nitrosopyridine

Using essentially the same procedures as described above in Example 6, 10 g. of 3,5-dichloro-2-(methylsulfonyl)-4-pyridinethiol are reacted at 0° C. with 40 ml. of 100 percent $HNO_3$. The material recrystallized from hexane is a yellow solid having a melting point of 147° C. which is of good solubility in benzene, hexane and acetone and substantially insoluble in water. Infrared analysis indicates the product to be the above captioned compound, and this identification is confirmed by elemental analysis which shows the compound to have carbon, hydrogen, chlorine, nitrogen and sulfur contents of 27.5, 1.6, 24.88, 10.12 and 12.76 percent, respectively, as against theoretical values for these elements of 28.2, 1.57, 27.8, 10.98 and 12.56 percent, respectively.

EXAMPLE 9

Using essentially the same procedures as described above in Example 2, other polyhalo-4-nitrosopyridines are prepared by reacting 100 percent $HNO_3$ with the indicated pyridinethiol derivative, as follows:

3,5-dichloro-2,6-difluoro-4 - nitrosopyridine having a molecular weight of 212.98 by the reaction by 3,5-dichloro-2,6-difluoro-4-pyridinethiol with nitrile acid.

2,3,5-tribromo-4 - nitrosopyridine having a molecular weight of 324.81 by the reaction of 2,3,5-tribromo-4-pyridinethiol with nitric acid.

3,5 - dichloro - 2-fluoro-4-nitroso-6-(trifluoromethyl) pyridine having a molecular weight of 262.99 by the reaction of 3,5 - dichloro-2-fluoro-6-(trifluoromethyl)-4-pyridinethiol with nitric acid.

3,5 - dichloro - 2 - fluoro-6-(methylsulfonyl)-4-nitrosopyridine having a molecular weight of 273.07 by the reaction of 3,5 - dichloro-2-fluoro-6-(methylsulfonyl)-4-pyridinethiol with nitric acid.

3,5-dichloro-6-fluoro - 4 - nitrosopicolinonitrile having a molecular weight of 220.0 by the reaction of 3,5-dichloro-6-fluoro-4-mercaptopicolinonitrile with nitric acid.

3,5-dibromo-6-fluoro-4 - nitrosopicolinonitrile having a molecular weight of 308.91 by the reaction of 3,5-dibromo-2-fluoro-4-mercaptopicolinonitrile with nitric acid.

3,5-dibromo-2,6-difluoro-4-nitrosopyridine having molecular weight of 301.89 by the reaction of 3,5-dibromo-2,6-difluoro-4-pyridinethiol with nitric acid.

2-bromo-3,5-dichloro-4-nitrosopyridine having a molecular weight of 255.9 by the reaction of 2-bromo-3,5-dichloro-4-pyridinethiol with nitric acid.

2,3,5 - tribromo - 6-(methylsulfonyl)-4-nitrosopyridine having a molecular weight of 422.89 by the reaction of 2,3,5 - tribromo-6-(methylsulfonyl)-4-pyridinethiol with nitric acid.

The polyhalo-4-nitrosopyridine compounds of the present invention are useful as pesticides and have particular utility as fungicides and bactericides, as selective herbicidal agents or the control of various undesirable weed plants, and as anthelmintics in the control of intestinal parasites. In such applications the pest to be controlled is contacted with a pesticidal amount of one or more of the compounds of the invention. For control of bacterial and fungal pests, the organism is contacted with a pesticidal amount which is also an antimicrobial amount of the compound. For control of weed pests, a pesticidal amount which is also an herbicidal amount is employed.

For all such uses the present nitrosopyridine compounds can be employed in an unmodified form or they can be dispersed on a fiinely divided solid and employed as dust or dispersed in water with or without the aid of a surface active agent and the resulting aqueous suspensions employed as drenches or sprays. In other procedures, the products are employed as active constituents in solvent solutions, in oil-in-water or water-in-oil emulsions, or in aqueous dispersions. All such ingredients and adjuvants cooperate with the active component so as to facilitate the invention and obtain an improved and outstanding result.

The foregoing augmented compositions are adapted to be formulated as liquid or solid concentrates and subsequently diluted with additional liquid or solid adjuvants to produce the ultimate treating composition. Suitable emulsifiable liquid concentrates are formulations of the active nitrosopyridine compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition. For the control of higher plants in soil, the active substituted pyridine compounds hereof ordinarily are distributed in soil in amounts of from about 0.1 to 50 lbs. or more per acre so as to contact seeds and emerging seedlings of the vegetation to be controlled. For the control of bacteria and of lower plants such as fungal organisms, the active compounds usually are applied to growth media of said organisms in amounts to provide from about 10 or less to about 5,000 or more parts by weight of the active substituted pyridine compound per million parts of the ultimate treating composition.

In representative operations, tetrabromo-4-nitrosopyridine is dispersed in warm melted nutrient agar which is then poured into petri dishes and allowed to solidify, the pyridazine compound being employed in a number of different amounts to provide from 1 to 500 parts by weight thereof per million parts (p.p.m.) of the ultimate agar composition. The surface of the agar is then inoculated with a variety of bacterial and fungal pest organisms, and the inoculated plates are incubated under conditions conducive to bacterial and fungal growth. Similar check plates in which the agar contains no activ nitrosopyridine or other toxicant compound are similarly inoculated and incubated. In such operations, 100 percent control is obtained of the organisms Bacillus subtilis at a level of 10 p.p.m.; of Staphylococcus aureus, Candida albicans, Pseudomonas aeruginosa, Pseudomonas sp. sprain 10, Mycobacterium phlei, athletes foot, Pullularia pullulans, Cephaloascus fragans and Rhizopus nigricans at a level of 100 p.p.m.; and of Escherichia coli, Aerobacter aerogenes, Salmonella typhosa and Candida pelliculosa, Ceratocystis ips, Aspergillus terreus and Trichoderma sp. at a level of 500 p.p.m.

In similar tests wherein the chemical 2,3,5-trichloro-6-fluoro-4-nitrosopyridine is admixed in agar solutions, complete control is obtained of the organism Bacillus subtilis at a level of 1 p.p.m.; of Staphylococcus aureus and Mycobacterium phlei at a level of 10 p.p.m.; of athletes foot at 100 p.p.m.; and of Candida albicans, Salmonella typhosa, Candida pelliculosa, Pullularia pullulans, Cephaloascuc fragans, Ceratocystis ips, Trichoderma sp. Aspergillus terreus and Rhizopus nigricans at a level of 500 p.p.m.

With other agar tests incorporating 2,3,5-trichloro-4-nitrosopyridine as the active chemical, complete control is obtained of the organisms Mycobacterium phlei, athletes foot and Bacillus subtilis at a level of 100 p.p.m. of active chemical, while similar control is obtained of the organism Staphylococcus aureus, Candida albicans, Candida pelliculosa, Pullularia pullulans, Cephaloascus fragans, Ceratocystis ips, Trichoderma sp. and Aspergillus terreus at 500 p.p.m.

In representative operations the chemical 2,3,5-trichloro-4-nitrosopyridine in an aqueous emulsified composition containing about 100 parts by weight of the active compound per million parts of the aqueous composition, when applied as a soil drench at a dosage rate of 10 lbs. of active chemical per acre, provides 100 percent control of fertile soil planted with pigweed or barnyard grass. Similarly, this chemical gives 95 percent control of Chlorella algae at a concentration of 10 parts per million parts of the algae supporting medium. It gives 100 percent control of the weed pest spiny clothbur when applied thereto in the form of an aqueous spray emulsion containing 4,000 parts per million of active chemical. In similar spray tests at this concentration of active as made with tetrabromo-4-nitrosopyridine there is obtained 100 percent control of broad-leafed plants, as exemplified by cotton.

The compound 2,3,5-trichloro-6-fluoro-4-nitrosopyridine, when applied as a soil drench at a dosage rate of 10 lbs., of active chemical per acre, gives 100 percent control of fertile soil planted with pigweed or watergrass, and 60 percent control when planted with bindweed or rice.

In similar operations, the chemical 2,3,5-trichloro-4-nitroso-6-(trifluoromethyl)pyridine gives 100 percent control of plant growth in soil planted with pigweed and 90 percent control for soil planted with bindweed.

In other operations, either of the chemicals 3,5,6-trichloro-4-nitropicolinonitrile or 3,5,6-trichloro-4-nitro-6-(trifluoromethyl)pyridine, are applied as a soil drench in the manner described above at a concentration of 100 parts of active chemical per million parts of soil infested with Rhizoctonia solani (a damp-off pathogen); effective control of this organism is realized when the soil is subsequently planted in cotton.

The utility of the compounds as anthelmintics may be seen from the fact that 100 percent control of mouse tapeworm is obtained by incorporating tetrachloro-4-nitrosopyridine in the diet of mice host animals at a level of 0.06 percent by weight.

When applied at a dosage level of from about 100 to 5,000 parts per million, each of the compounds of the present invention, the utility of which is not specifically recited above, has the ability to kill, inhibit or otherwise control or more of the aforesaid or other fungal, bacterial, parasital or weed pests.

The polyhalo-4-pyridinethiol compounds (optionally substituted in the 2-position with cyano or trifluoromethyl groups) employed as starting materials to react with concentrated $NHO_3$ to form the corresponding 4-nitrosopyridine derivatives of the present invention, can be prepared by reacting the corresponding compounds wherein the 4-position of the pyridine ring is substituted by chloro, fluoro or bromo groups with sodium sulfide or sodium hydrosulfide. In the case of the polyhalo-4-nitrosopyridine compounds hereof which are substituted in the 2-position by methylsulfonyl, one or the other of the latter sulfide reagents is reacted with a polyhalopyridine containing a methylsulfonyl group in both the 2- and the 4-positions of the pyridine ring, the group in the 4-position being thereby converted to a thiol group.

The reaction by which a halo atom in the 4-position of the pyridine ring is replaced by mercapto takes place as the halo derivative is refluxed with an equivalent amount of the sodium sulfide in an aqueous reaction medium for a period of about 1 to 4 hours. At the conclusion of the reaction the mixture is acidified, thus forming the desired thiol compound together with sodium halide as a by-products. This method can be employed to prepare such compounds as 2,3,5-trichloro-4-pyridinethiol,
tetrachloro-4-pyridinethiol,
tetrabromo-4-pyridinethiol,
2,3,5-tribromo-4-pyridinethiol,
3,5-dichloro-2,6-difluoro-4-pyridinethiol,
2-bromo-3,5-dichloro-4-pyridinethiol,
2,3,5-trichloro-6-fluoro-4-pyridinethiol,
3,5-dibromo-6-fluoro-4-mercaptopicolinonitrile,
2,3,5-trichloro-6-(trifluoromethyl)-4-pyridinethiol,
3,5,6-trichloro-4-mercaptopicolinonitrile,
3,5,6-tribromo-4-mercaptopicolinonitrile,
3,5-dibromo-2,6-difluoro-4-pyridinethiol and
3,5-dichloro-2-fluoro-6-(trifluoromethyl)-4-pyridinethiol, for example. In a typical reflux preparation, $Na_2S \cdot 9H_2O$ and tetrachloro-2-(trifluoromethyl)-pyridine in an sopropanol medium are refluxed for 3 hours. The reaction mixture is then cooled, diluted with water and acidified, thereby precipitating the 2,3,5-trichloro-6-(trifluoromethyl)-4-pyridinethiol which is filtered off, recrystallified from hexane and carefully dried with $Na_2SO_4$ before being reacted with concentrated $HNO_3$ to form the ultimate 2,3,5-trichloro-4-nitroso-6-(trifluoromethyl)pyridine compound.

The reaction of sodium sulfide with the polyhalo-2,4-di(methylsulfonyl)-pyridine takes place as the latter compound, in a solvent such as dimethoxyethane, is reacted at room temperatures with an aqueous solution of $Na_2S \cdot 9H_2O$, the reaction proceeding rapidly. Finally, the solution is acidified with dilute HCl to convert the sodium salt to the desired polyhalo-2-(methylsulfonyl)-4-pyridinethiol compound which is filtered offed and dried before being reacted with the concentrated $HNO_3$ to form the 4-nitroso product.

I claim:
1. A polyhalo-4-nitrosopyridine compound of the formula:

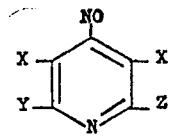

wherein
X represents chlorine or bromine,
Y represents hydrogen, chlorine or bromine and
Z represents cyano, trifluoromethyl or methylsulfonyl.

2. The compound as defined in claim 1 which is 2,3,5-trichloro-4-nitroso-6-(trifluoromethyl)pyridine.

3. The compound as defined in claim 1 which is 3,5,6-tribromo-4-nitrosopicolinonitrile.

4. The compound as defined in claim 1 which is 3,5-dichloro-2-(methylsulfonyl)-4-nitrosopyridine.

References Cited

Roberts et al., J. Chem. Soc. (C) (1968), p. 1537–41.

HENRY R. JILES, Primary Examiner

H. J. MOATZ, Assistant Examiner

U.S. Cl. X.R.

71—94; 260— 294.8 F, 294.9

PO-1050
(5/69)

UNITED STATES PATENT OFFICE
CERTIFICATE OF CORRECTION

Patent No. 3,651,066     Dated 21 March 1972

Inventor(s) Penelope B. Domenico

It is certified that error appears in the above-identified patent and that said Letters Patent are hereby corrected as shown below:

Column 1, line 56, change "tetrochloro-" to -- tetrachloro- --.

Column 2, line 43, delete "those" and insert --the--.

Column 4, line 57, delete "nitrile" and insert --nitric--.

Column 5, line 14, delete "or" and insert --of--.

Column 6, line 8, delete "activ" and insert --active--.

line 13, delete "sprain" and insert --strain--.

line 27, delete "-aloascuc" and insert -- -aloascus --.

Signed and sealed this 25th day of July 1972.

(SEAL)
Attest:

EDWARD M. FLETCHER, JR.
Attesting Officer

ROBERT GOTTSCHALK
Commissioner of Patents